(12) United States Patent
Inamitsu et al.

(10) Patent No.: US 6,505,297 B1
(45) Date of Patent: Jan. 7, 2003

(54) IC CARD TERMINAL DEVICE AND INSTALLATION OF APPLICATION PROGRAM INTO IC CARD TERMINAL DEVICE

(75) Inventors: Tetsuharu Inamitsu, Chigasaki (JP); Masayuki Inoue, Fujisawa (JP); Koichi Yoneta, Yokohama (JP); Shigeyuki Itoh, Zushi (JP); Yutaka Takami, Yokohama (JP); Kenji Matsumoto, Yokohama (JP); Kazuhiro Kawashima, Yokohama (JP)

(73) Assignees: Hitachi, Ltd., Tokyo (JP); Hitachi Video and Information System, Ltd., Kanagawa (JP)

( * ) Notice: Subject to any disclaimer, the term of this patent is extended or adjusted under 35 U.S.C. 154(b) by 0 days.

(21) Appl. No.: 09/391,490

(22) Filed: Sep. 8, 1999

(30) Foreign Application Priority Data

Sep. 9, 1998 (JP) ............................................. 10-254836
Feb. 3, 1999 (JP) ............................................. 11-025964

(51) Int. Cl.[7] .............................. G06F 9/00; G06F 3/00; G06F 13/00
(52) U.S. Cl. .................................. 713/1; 710/9; 710/72
(58) Field of Search ........................... 710/8, 9, 18, 19, 710/36, 37, 62, 74; 396/48, 57, 211; 711/115; 713/1

(56) References Cited

U.S. PATENT DOCUMENTS

| | | | | |
|---|---|---|---|---|
| 5,260,735 A | * | 11/1993 | Ishikawa et al. | 396/287 |
| 5,339,400 A | * | 8/1994 | Iijima | 711/115 |
| 5,590,373 A | * | 12/1996 | Whitley et al. | 710/8 |
| 5,757,639 A | * | 5/1998 | Yamada | 364/131 |
| 5,900,875 A | * | 5/1999 | Haitani et al. | 345/349 |
| 6,006,039 A | * | 12/1999 | Steinberg et al. | 396/57 |
| 6,085,268 A | * | 7/2000 | Lee et al. | 710/72 |
| 6,088,730 A | * | 7/2000 | Kato et al. | 709/227 |
| 6,151,652 A | * | 11/2000 | Kondo et al. | 710/129 |
| 6,182,170 B1 | * | 1/2001 | Lee et al. | 710/65 |
| 6,275,875 B1 | * | 8/2001 | Yamada | 710/9 |
| 6,295,564 B1 | * | 9/2001 | Shigetomi et al. | 710/74 |
| 6,336,151 B1 | * | 1/2002 | Seki | 710/8 |

FOREIGN PATENT DOCUMENTS

JP          5-110976          4/1993

* cited by examiner

Primary Examiner—Thomas Lee
Assistant Examiner—Chun Cao
(74) Attorney, Agent, or Firm—Mattingly, Stanger & Malur, P.C.

(57) ABSTRACT

When installing a new system application in the terminal device which can read from and store in the IC card, the application is installed by communicating with a host machine through a connector for the IC card attached to the terminal device, without an exclusive interface mechanism for installing the application.

18 Claims, 17 Drawing Sheets

Fig. 16

| install application number | | | | 1 | |
|---|---|---|---|---|---|
| NO | appli. name | appli. identifier | version | time for use | size (byte) |
| 1 | ABCDEFG | 0123456789 | V 0 1 0 1 | H11.12.31 | 30000 |
| 2 | | | | | |
| 3 | | | | | |

Fig. 17

| NO | size (byte) | address | using appli. identifier | using flag |
|---|---|---|---|---|
| 1 | 6 5 5 3 5 | H'200000 | 0123456789 | ON |
| 2 | 6 5 5 3 5 | H'210000 | | OFF |
| 3 | 3 2 7 6 8 | H'220000 | | OFF |

IC CARD TERMINAL DEVICE AND INSTALLATION OF APPLICATION PROGRAM INTO IC CARD TERMINAL DEVICE

BACKGROUND OF THE INVENTION

The present invention relates to the system and/or method for installing applications into terminal devices.

Especially, the present invention relates to the installing system and/or installing method for installing a plurality of system application programs into the handy terminal device that can read from and store into an IC card, particularly that is designed specifically for transfering currency amounts with an IC (integrated circuit) cash card.

In a case where a system application is installed into the conventional handy terminal device, the handy device is disassembled. A memory stored the system application is removed from the handy device to exchange or to restore the system application. For installing the system application, the handy device is sent to a service center to restore the system application. As a result, the system application could not be restored quickly, and it takes much time until returning the handy device to the user.

On the other hand, an exclusive connector is needed in the handy device to install the application without disassembling its case. The system application can be installed into the handy device from a host machine through the connector.

SUMMARY OF THE INVENTION

In the conventional handy device, an exclusive connector in the handy device is needed for installing the system application. In addition, cost is increased by a larger device and increase of parts for providing the exclusive connector. Further, there is another problem that the host machine has to hold all control programs corresponded to each memory mounted on the handy device, in case the host machine controls memory to be restored at the time of installing the system application.

It is an object of the present invention that the system application can be installed easily in the handy device with existing components when the system application is installed into the handy device that can read from and store into the IC card.

To achieve this object, an installing system of the invention comprises a handy device that includes memory for storing the system application program, controlling the address to store the system application program into the memory means, managing address area into which the system application program is stored and the stored system application program, controlling communication between the handy device and host machine, reading from and storing into the IC card, an IC card connector coupled to read from and store into the IC card, and a display.

The installing system of the invention also comprises a communication cable, one end to be connected with the IC card connector of the handy device, and another end connected with the host machine. The installing system of the invention further comprises the host machine which controls communication with the handy device to install the system application and system application information. Then, the system application program is installed into the handy device through the IC card connector.

In addition, the IC card storing the system application program is connected with the IC card connector, then the system application program read from the IC card is installed in the memory mounted on the handy device. Further, the host machine is connected for reading from and storing into the IC card through the communication cable.

The handy device transmits storing address of the system application program to the host machine through reading from and storing into the IC card, and receives the system application program corresponded to the address from the host machine. The received system application program is installed into the predetermined area of the memory. The system application program is installed into the handy device by using the IC card connector which the handy device already has. The cost of the handy device does not increase, because it is not necessary to provide the exclusive connector for installing the system application program in the handy device. The host machine does not need to recognize the classification of the flash memory mounted on the handy device, because the handy device controls the memory to restore it by using the storing and the managing features which the handy device already has. Therefore, load of the host machine can be reduced.

BRIEF DESCRIPTION OF THE DRAWING

FIG. 16 is a diagram showing the structure of the application management table concerned with the sixth embodiment.

FIG. 17 is a diagram showing the structure of the block management table concerned with the sixth embodiment.

DETAILED DESCRIPTION OF PREFERRED EMBODIMENTS

The first embodiment will now be described by using FIG. 1, FIG. 2, FIG. 3 and FIG. 4.

Figure 1:
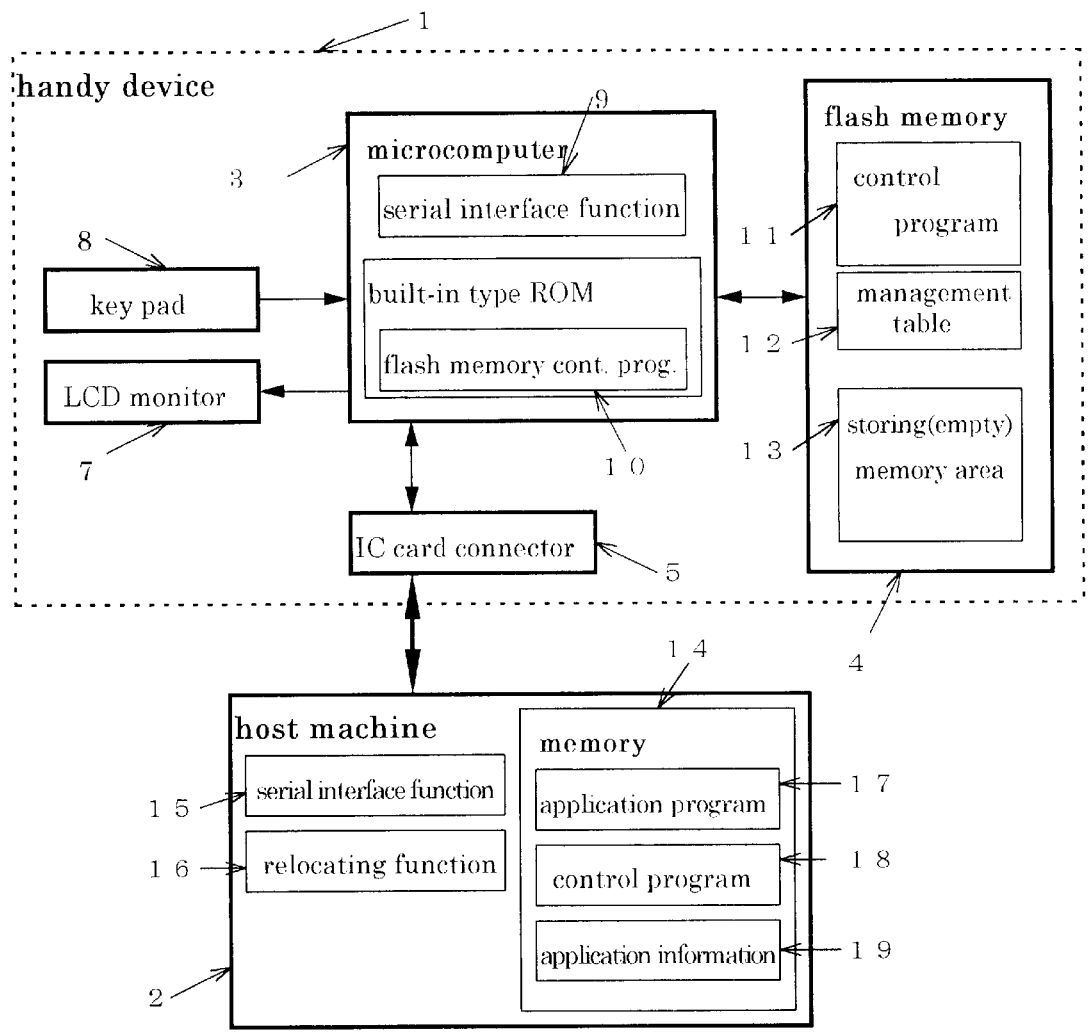
FIG. 1 is a block diagram showing the structure of the first embodiment of the present invention.

FIG. 1 is a block diagram showing the structure of the first embodiment of the present invention. The installing system of this embodiment is comprised of a handy device 1, a host machine 2 and an interface cable 20 which connects the handy device 1 and the host machine 2. The handy device 1 comprises microcomputer 3, flash memory 4, IC card connector 5 which is coupled to the microcomputer 3 and through which IC card data and application program are transmitted, LCD monitor 7 which is controlled by the microcomputer 3 to display character information, etc. on the basis of the data and control signal, and key pad 8 coupled to the microcomputer 3 for inputting. The microcomputer 3 has built-in type ROM for storing control program 10 of flash memory 4 and serial interface function 9. The flash memory 4 is coupled to the microcomputer 3, and the data and the control signal are transmitted to and received from the microcomputer 3. In addition, control program 11 to load the system application, management table 12 which manages application data installed in the handy device 1 and storing memory area 13 for storing the application data are stored into the flash memory 4. The host machine 2 has memory 14 into which application program 17, application information 19 and control program 18 for controlling the host machine operation are stored. The application information 19 shows application name, application identifier, version information, time limit for using, application size, etc. The host machine 2 also has relocating function 16 which can relocate application data to any address, and serial interface function 15. It is very difficult to have a relocating function 16 in the handy device, because capacity of the memory mounted on the handy device is very little compared with the host machine. Therefore, the relocating function 16 is held in the host machine.

Interface cable 20 couples handy device 1 and the host machine 2. One side of cable 20 coupled to the handy device 1 forms the shape which can be coupled to IC card connector 5 of handy device 1. The other side of cable 20 coupled to host machine 2 forms the shape that can be coupled to the serial port of the host machine.

Figure 2:
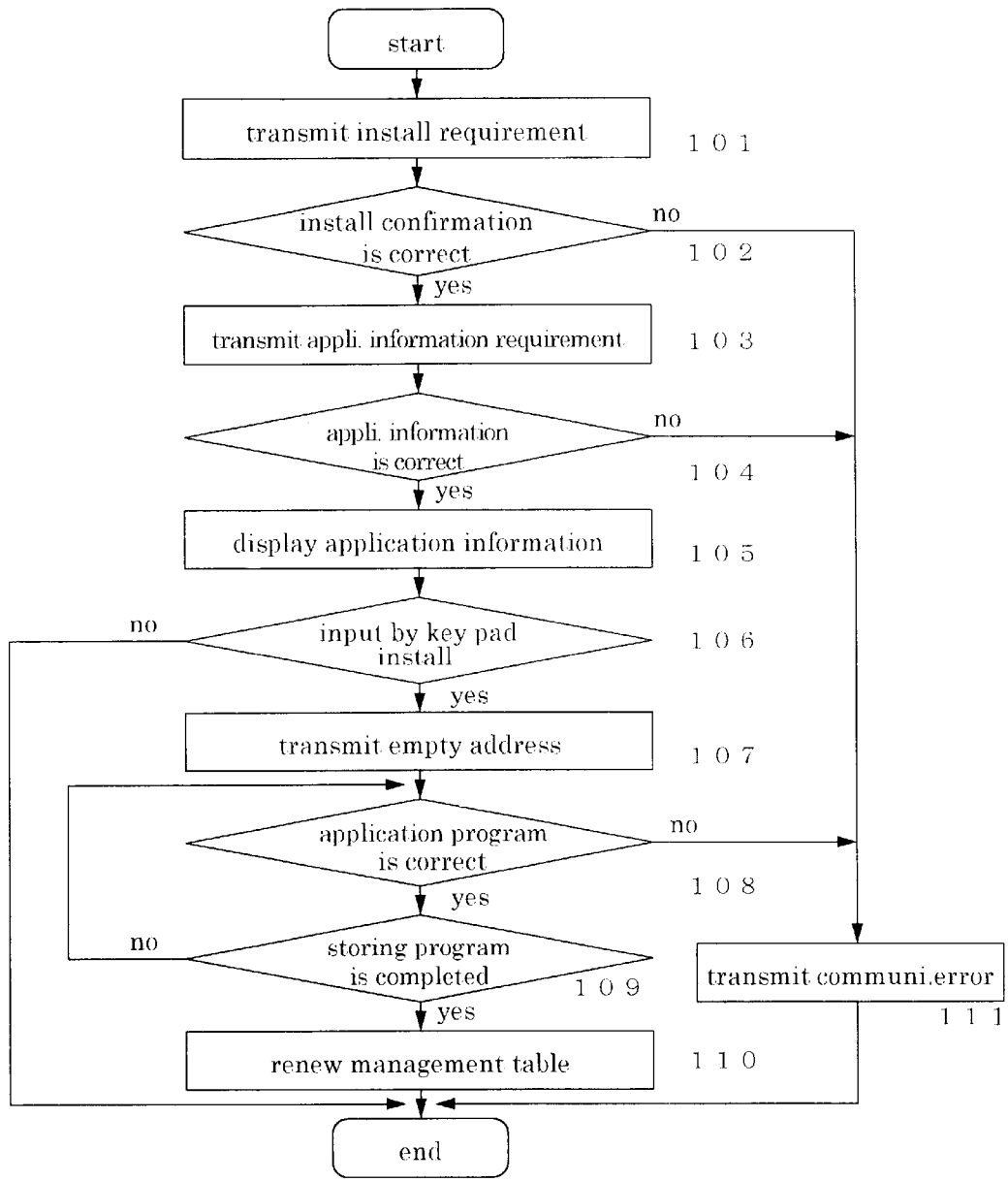
FIG. 2 is a flowchart showing the operation of the first embodiment.

FIG. 2 shows the process of loading system application program to flash memory 4 mounted on the handy device shown in FIG. 1. In case the system application program is loaded to handy device 1, one side of interface cable 20 is inserted in IC card connector 5 on the handy device 1, and the other side is coupled to the host machine 2. After coupling, the microcomputer 3 on the handy device 1 transmits the command of the application install requirement to the host machine 2 through the IC card connector 5 by using serial interface function 9 (step S101). In case the host machine 2 correctly receives the command of the application install requirement, the host machine 2 transmits the data of application install confirmation to the handy device 1. The microcomputer 3 on the handy device 1 confirms whether application install confirmation data received through the IC card connector 5 is correct or not (step S102). In case it is recognized as correct, the microcomputer 3 on handy device 1 transmits the data of the application information requirement to the host machine 2 (step S103). The host machine 2 notifies the handy device 1 of application information 19 (application name, application identifier, version information, time for using and application size) which is loaded into the flash memory 4 on the handy device 1 when the command of the application information requirement is received. The handy device 1 which receives the data of application information 19 confirms by microcomputer 3 whether received information is correct or not (step S104). In case it is recognized as correct, the handy device 1 displays received application information on a LCD monitor 7 (step S105). By using input device key pad 8, the user selects whether the application information is installed (step 106). In case it is recognized that the install of the application information is executed (step 106), the microcomputer 3 on the handy device 1 detects an empty address (storing memory area 13) of the flash memory 4 into which the received system application program can be stored. The microcomputer 3 on the handy device 1 informs the host machine 2 of the detected empty address, and requires the host machine 2 to send the system application program (step 107). The host machine 2, which receives the address showing the empty area, relocates the address information of system application program 17 by using relocation function 16 to correspond to the received address. Then, the host machine 2 transmits the relocated system application program to the handy device 1 by data blocks of 256 bytes, for example. The microcomputer 3 on the handy device 1 which receives system application program 17 confirms whether received information is correct or not (step S108). And then, in case it is correct, the received system application program is stored into the flash memory 4 by using flash memory control program 10, and the host machine 2 is informed of the notification of completing the storing of the system application program. In case all system application programs 17 are transmitted, the host machine 2 transmits the notification of completing the storing program. In case there still is data of system application program 17 to be transmitted, the host machine 2 transmits the following data to handy device 1. In case of receiving the notification of completing the storing of the system application program (step 109), the microcomputer 3 on the handy device 1 stores the application information 19 into the management table 12 which manages the installed system application stored into the flash memory 4 (Step S110). The microcomputer 3 on the handy device 1 informs the host machine 2 of the notification of completing the storing of the system application application, and application install processing is completed. On the other hand, in case it is recognized that there is an error in data received at the time of each data receiving communication, the microcomputer 3 transmits the communication error to the host machine 2. (step S111)

By the processing mentioned above, the system application is installed into the handy device by using the IC card connector. In the handy device with the interface of RS-232C, the application is installed into the handy handy by using the RS-232C.

Figure 3:
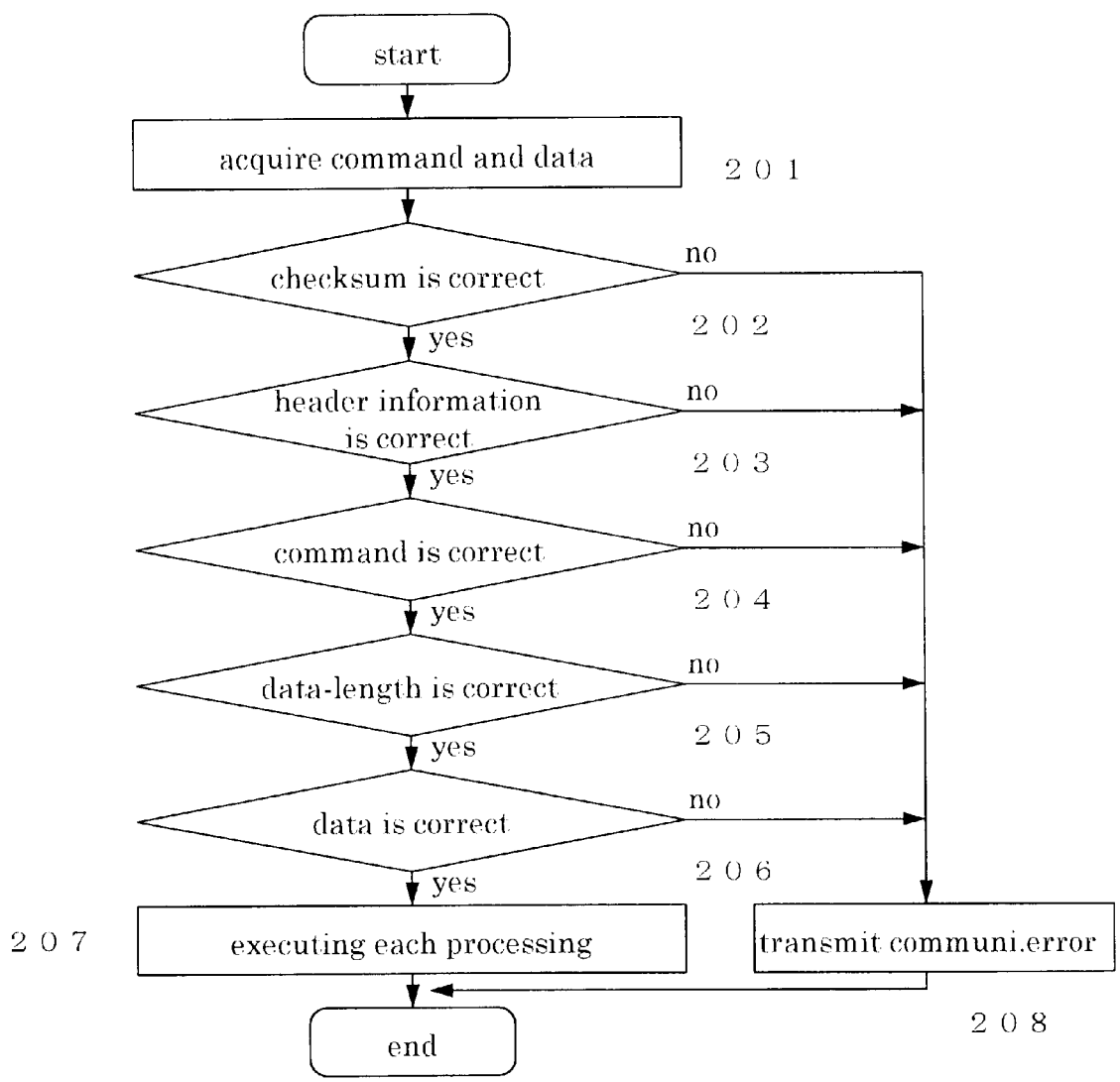
FIG. 3 is a flowchart showing the operation of the handy device of the first embodiment.
Figure 4:
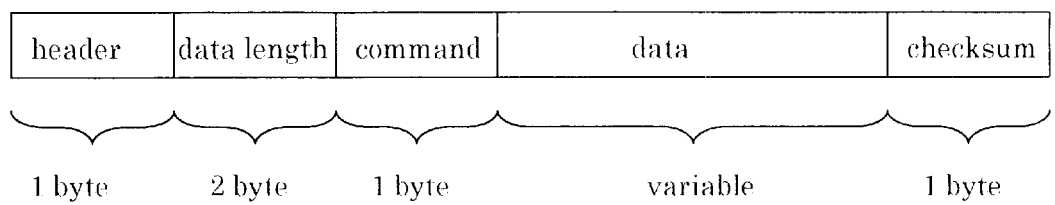
FIG. 4 is a diagram showing the structure of the communication data concerned with the first embodiment.

Next, the communication protocol between the handy terminal of the present invention and the host machine will be described by using FIG. 3 and FIG. 4. FIG. 3 is the flowchart which shows the processing of the microcomputer 3 shown in FIG. 1. FIG. 4 is a block diagram showing the structure of the command used at the time of communicating.

The requirement command which requires processing and the answer command that informs of the processing result have the same structure. For example, as it is shown in FIG. 4, the command is composed of header (1 byte), data length (2 bytes), the command (1 byte), data which is variable with each command, and checksum (1 byte). The header confirms the requirement command(0×00) or answer command(0× 01). The data length shows the length of the data from the command to the checksum. The command indicates the each processing instruction. The data shows data which is necessary to execute each command. The checksum shows the complement of one of additional result which is the result of adding length of the header and data, the command and data in the byte. In case communication data is transmitted from the host machine 2, the microcomputer 3 acquires three bytes of length of the header and data, first. Then, the remaining command and data are acquired (step 201). In case data is acquired correctly, the checksum is confirmed (step 202). Adding from the command to the data in the byte unit, and the complement of one of addition data is acquired. The acquired complement data is compared with the checksum. When they are same, it is recognized that transmitted command data is correct. When they are different, it is recognized that transmitted command data is in error, and the microcomputer 3 transmits communication error to the host machine 2 (step 208). In case checksum is correct, the header is confirmed (step 203). In case the header is 0×00 the command data is recognized as the requirement command, in case the header is 0×01 the command data is recognized as the answer command, and other than them the command data is recognized as the header error. In case of the header error, notification of the communication error is transmitted to host machine 2 (step 208). In case the header is correct, the command is confirmed (step 204). In case the command other than the command installed into control program 11 is transmitted, the data is recognized as the command error. The notification of the error is transmitted to the host machine 2 (step 208). In case the command is correct, data length is confirmed (step 205). In case this data length is length of data other than length of the data that corresponds to each command, the data is recognized as the data length error, and notification of the error is transmitted to the host machine 2 (step 208). In case data length is correct, data is confirmed (step 206). In case the data is other than data which corresponds to each command, the data is also recognized as the data error, and notification of the error is transmitted to host machine 2 (step 208). In case the data is correct, control program 11 in flash memory 4 executes the processing which corresponds to each command (step 207). By processing mentioned above, the sequence data which is transmitted from the host machine can be distinguished, the requirement from the host machine can be correctly obtained, and invalid data can be removed.

Figure 5:
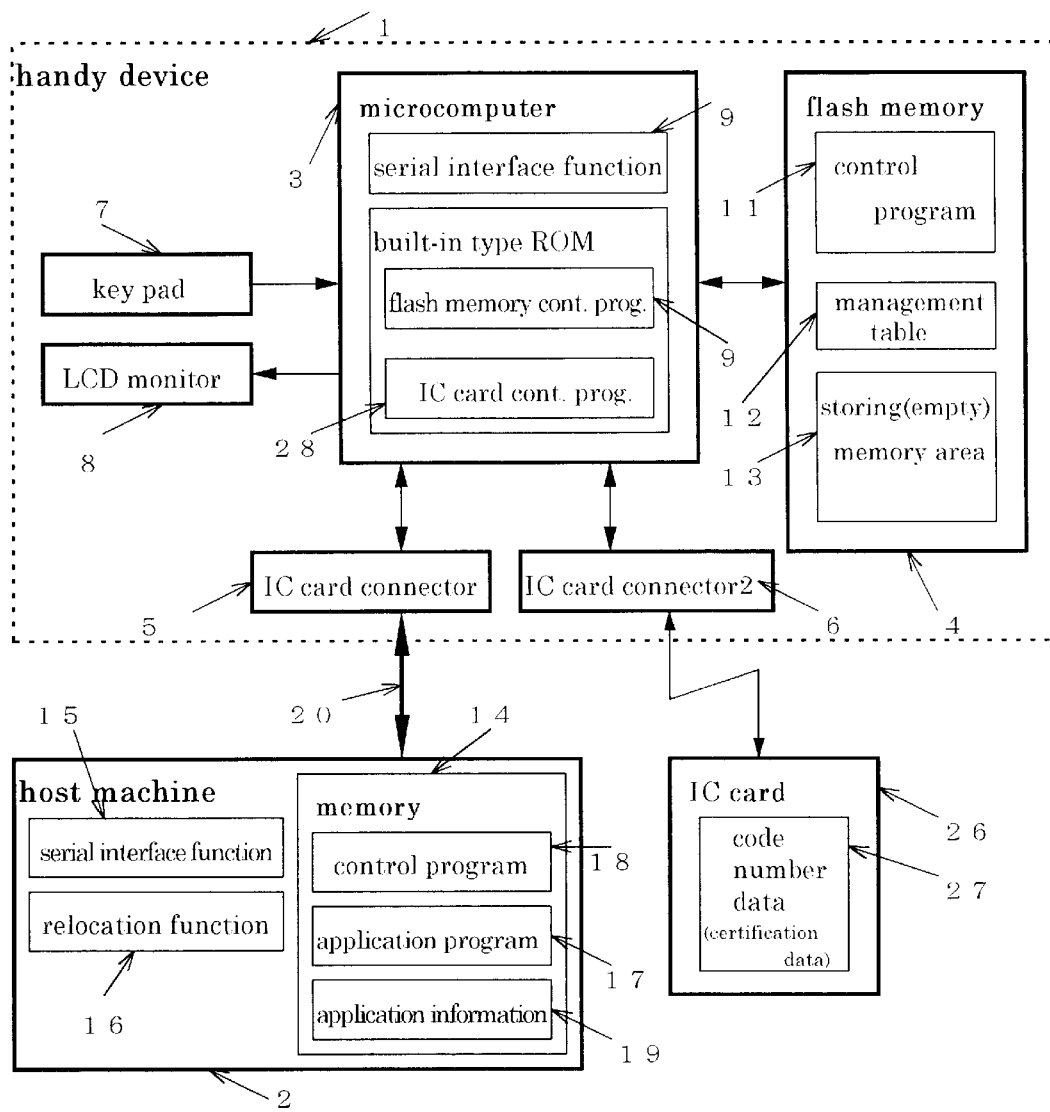
FIG. 5 is a block diagram showing the structure of the second embodiment of the present invention.

FIG. 5 is the block diagram showing the structure of the second embodiment of the present invention. The different point 1 from the first embodiment are that IC card control program 28 is stored in the built-in type ROM of the microcomputer 3, and a second IC card connector into which an IC card 26 is inserted is provided. Certification data 27 to recognize the propriety of installing the system application is stored in the IC card 26. Data is read from the IC card 26 inserted in the second IC card connector 6, and checked by IC card control program 28.

Figure 6:
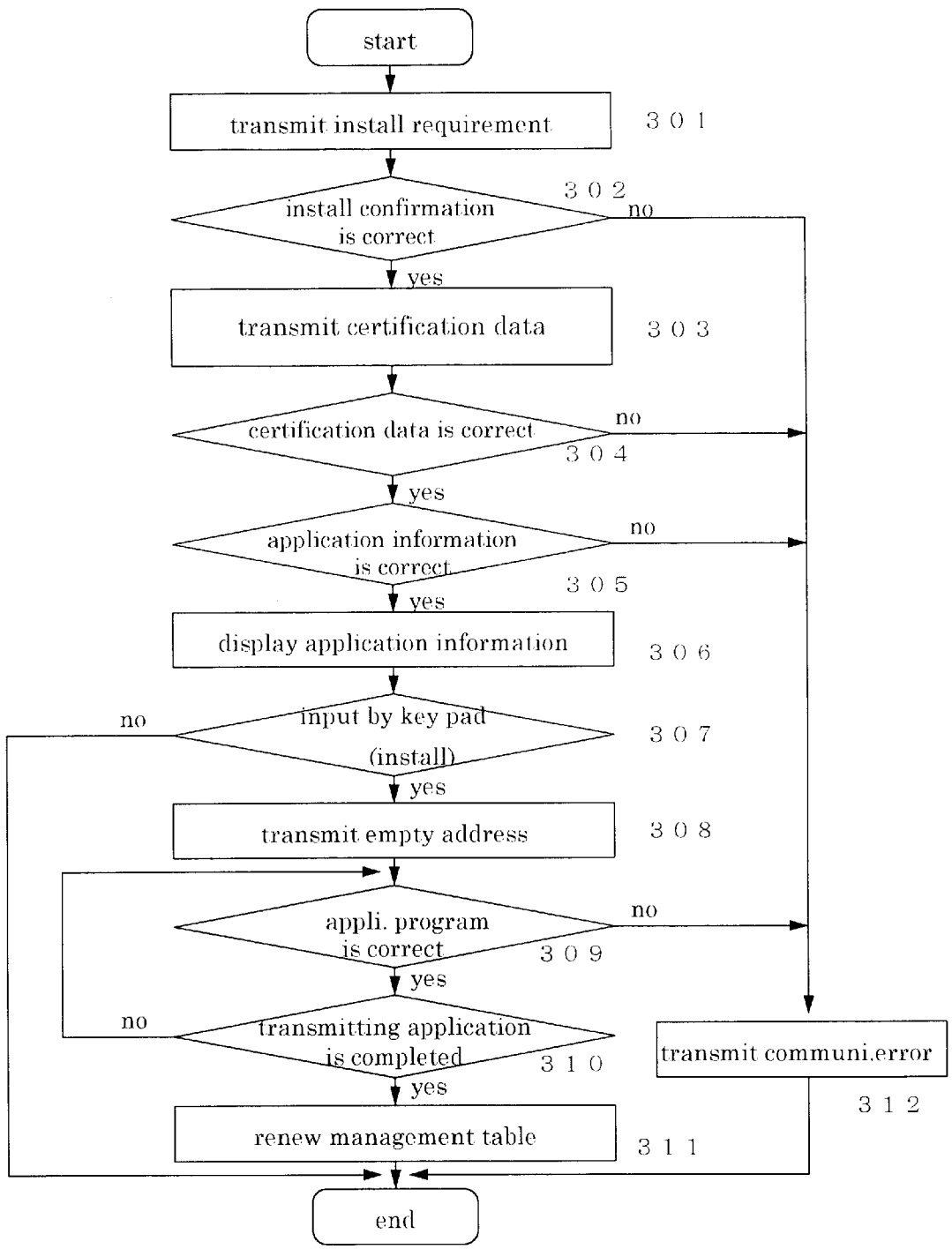
FIG. 6 is a flowchart showing the operation of the handy device concerned with the second embodiment

FIG. 6 is the flowchart showing the processing of the microcomputer shown in FIG. 5. In case the application program is loaded to the handy device 1, one side of the interface cable 20 is inserted in the IC card connector 5 on the handy device 1, and the other side is coupled to the host machine 2. The IC card 26 is inserted into the IC card connector 6. Then, the microcomputer 3 on the handy device 1 transmits the command which requires the install of the system application to host machine 2 by using serial interface function 9 through IC card connector 5 (step 301). In case the data of the application install requirement is correctly received, the host machine 2 transmits the data of application install confirmation to the handy device 1. Then, the microcomputer 3 on the handy device 1 confirms whether application install confirmation data received through IC card connector is correct or not (step 302). In case it is correct, certification data 27 stored in the IC card 26 inserted in the IC card connector 6 is read by IC card control program 28. After reading the certification data, the microcomputer 3 transmits the certification data to the host machine 2 through IC card connector 5 (step 303). Host machine 2 which receives certification data analyzes certification data (step 304). In case the certification data is correct, the host machine 2 transmits information 19 (application name, application identifier, version information, time for using and application size) which is stored into the flash memory to the handy device 1.

In the handy device 1 which receives the data of application information 19, the microcomputer 3 confirms whether the received information is correct or not (step 305). In case it is correct, the handy device 1 displays the application information 19 on LCD monitor 7 (step 306). At this time, the user inputs installing or not by using input device key pad 8 (step 307). In case it is recognized that the install of the system application data is executed, the microcomputer 3 on the handy device 1 detects the empty area of the flash memory 4 into which the received system application can be stored, and acquires the address of the empty area. The microcomputer 3 on the handy device 1 transmits the acquired address to the host machine 2 (step 308). The host machine 2, which receives the address showing the empty area, relocates the address information of system application program 17 by using relocation function 16 to correspond to the received address. And then, the relocated system application program is transmitted to handy handy 1 by blocks of 256 bytes, for example.

The microcomputer 3 on the handy device 1 which receives the system application program confirms whether received information is correct or not (step 309). In case it is correct, the microcomputer 3 installs the received system application program 17 into the flash memory 4, and transmits the notification of completing the storing program. When receiving the notification, the host machine 2 confirms whether all data of system application programs 17 are transmitted or not. In case all data of system application programs 17 were transmitted (Step 310), the notification of completing the transmitting program is transmitted to the handy device 1.

In case there still is data to be transmitted by user application program 17, the following data is transmitted to handy device 1. In case the notification of completing the transmitting program is received (step 109), the microcomputer 3 on handy device 1 stores the system application information into the management table 12 which manages the install application stored in flash memory 4 (step 311). The microcomputer 3 on handy device 1 transmits the notification of completing the transmitting program to the host machine 2, and processing of installing the system application is completed. On the other hand, in case data received at the time of each communication is recognized as error, the microcomputer 3 transmits the communication error to the host machine 2 (step 312).

As mentioned above, the data, which is stored in an IC card connected with one of the IC card connectors on the handy device, can be used as a key information for permitting of installing the application. By using the other IC card connector, system application program can be loaded, that is, stored into the flash memory 4 on the handy device 1, too. In the handy device having the RS-232C interface, by using the RS-232C interface, system application data is loaded. In case of attempted erasing of the application, the system application is not be erased when erasing is not permitted by certificating the IC card.

Figure 7:
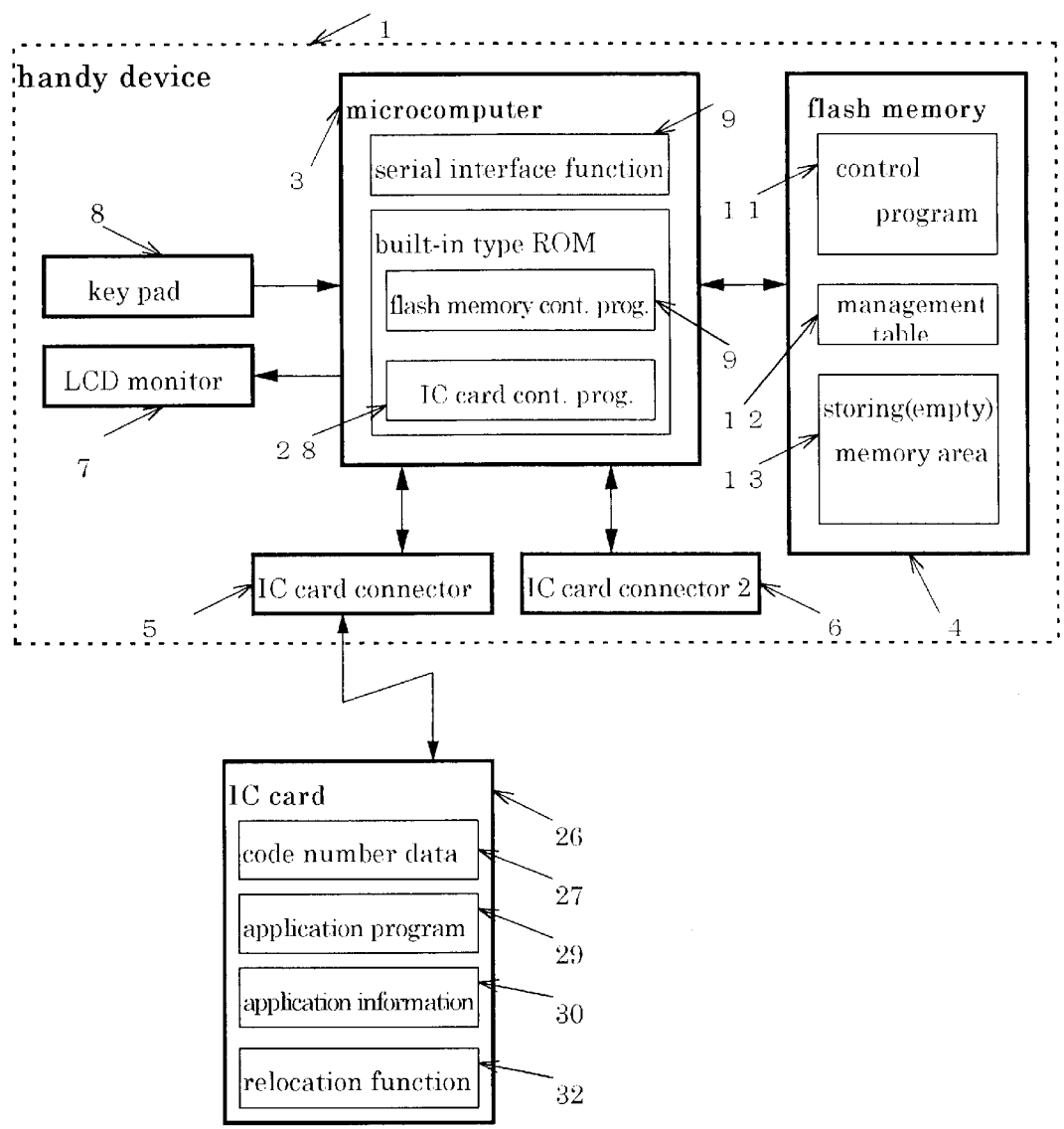
FIG. 7 is a block diagram showing the structure of the third embodiment of the present invention.

FIG. 7 is the block diagram showing the structure of the third embodiment. The different points from the second embodiment are that the host machine 2 and the interface cable 20 shown in FIG. 5 are deleted, and IC card 26 is inserted in IC card connector 5. In this embodiment, it is possible that IC card connector 6 is deleted. Code number data 27 for distinguishing the propriety of installing the application, application program 29, application information 30 (application name, application identifier, version information, time for using and application size), and relocation function 32 for relocating the application program to the specific address are stored in the IC card 26.

Figure 8:
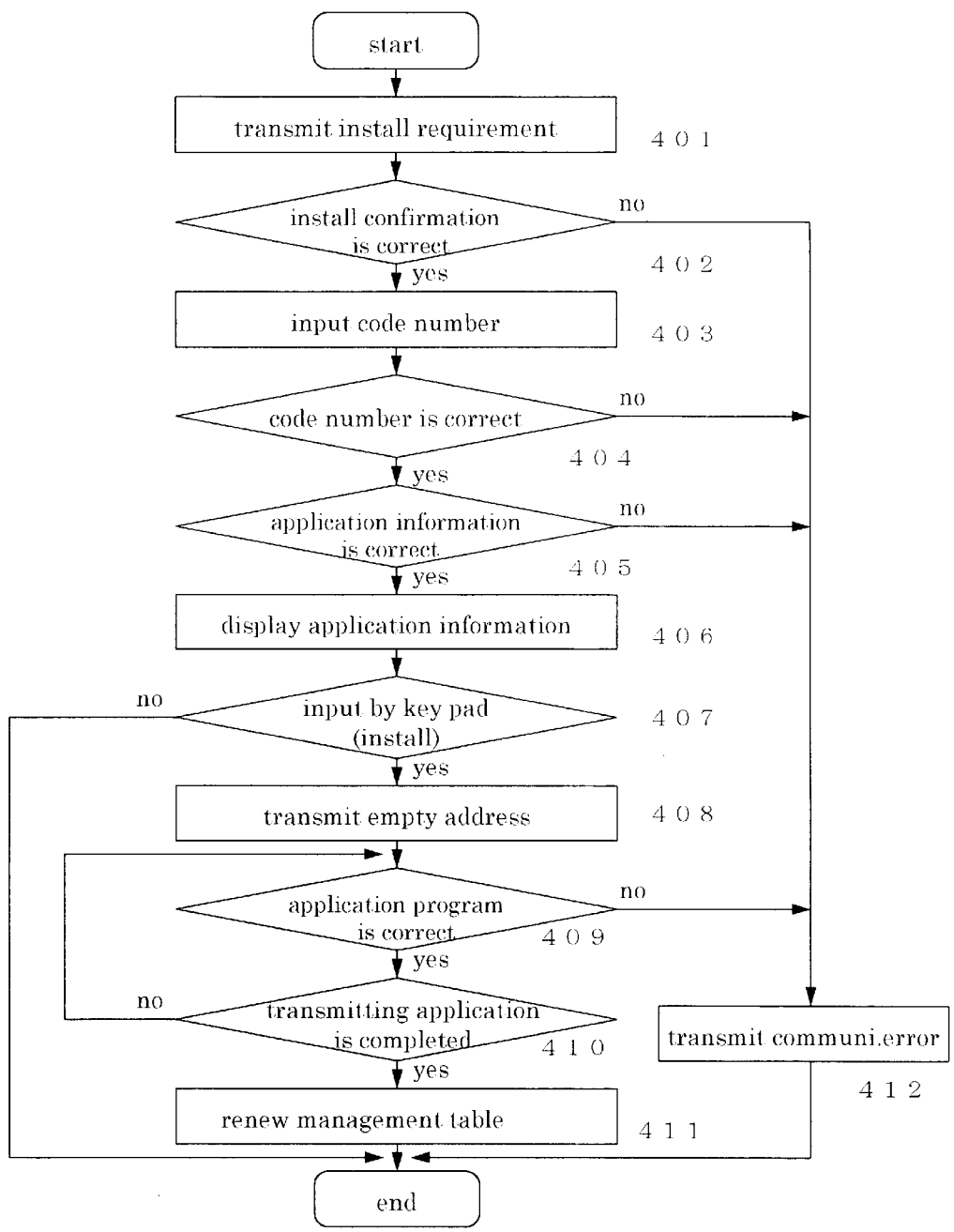
FIG. 8 is a flowchart showing the operation of the handy device concerned with the third embodiment.

FIG. 8 is the flowchart showing the processing of the microcomputer shown in FIG. 7. In case the system application program is loaded to the handy device 1, the IC card 26 is inserted in the IC card connector 5 on the handy device 1. The microcomputer 3 on handy device 1 transmits the data of the application install command to IC card 26 through IC card connector 5 by using IC card control program 28 (step 401). In case the IC card 26 correctly receives the data of the application install command, the IC card 26 transmits the data of application install confirmation to the handy device 1. Then, the microcomputer 3 on the handy device 1 confirms whether application install confirmation data received through IC card inserting hole 5 is correct or not (step 402). In case it is correct, the code number is input by using input device key pad 8 (step 403). The microcomputer 3 transmits the input code number to the IC card 26 through the IC card connector 5 and starts the certification program of the IC card. Then, IC card 26 confirms by the function of the certification program whether the code number is correct or not (step 404). In case it is correct, application information 30 (application name, application identifier, version information, use deadline and application size) is informed to the handy device 1. The microcomputer 3 on the handy device 1 confirms whether received information is correct or not, when accepting the data of application information 30 (step 405). In case it is correct, the handy device 1 displays the received application information 30 on the LCD monitor 7 (step 406). At this time, whether system application program is input or not is determined by using the input device key pad 8 (step 407). In case it is recognized that the install of the system application program is executed, the microcomputer 3 on handy device 1 detects the empty area of flash memory 4 into which the system application program is to be stored, and acquires the address of the empty area. The IC card 26, which receives the address showing the empty area, relocates the address information of system application program 29 to correspond to the received address by using relocation function 32. The IC card 26 transmits the relocated system application program 29 to the handy device 1 by blocks of 256 bytes, for example. The microcomputer 3 on handy device 1 confirms whether the received system application program is correct or not (step 409). In case it is correct, the microcomputer 3 stores the received system application program 29 into flash memory 4, and transmits the notification of completing the storing to the IC card 26. In case all system application program data 29 is transmitted (step 410), the IC card 26 transmits the notification of completing the transmitting application data. In case there still is untransmitted system application program data, the following data is transmitted to handy device 1.

In case the notification of completing the transmitting program is received, the microcomputer 3 on handy device 1 stores the application information 30 into the management table 12 which manages the install application stored in flash memory 4 (step 411). The microcomputer 3 on handy device 1 transmits the notification of completing the installing application to the IC card 26, and installing is completed. On the other hand, in case data received at the time of each communication is recognized as in error, the microcomputer 3 transmits the communication error to the IC card 26 (step 412). As mentioned above, the application data can be loaded to the handy device 1 by using IC card 26 connected with IC card connector 26. In case attempted erasing the application, the application is not erased when the code number input from the input device key pad 8 is not certified by the IC card.

Figure 9:
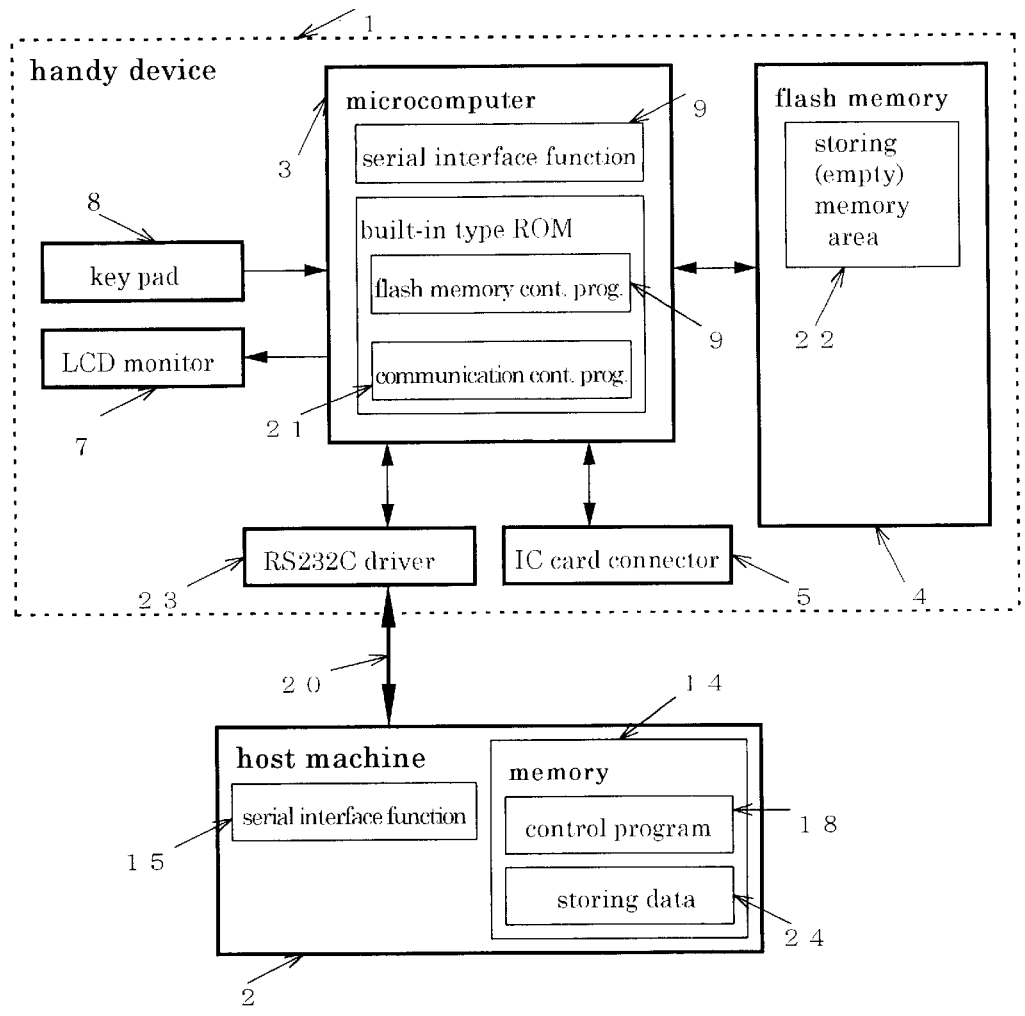
FIG. 9 is a block diagram showing the structure of the fourth embodiment of the present invention.

FIG. 9 is the block diagram showing the structure of the fourth embodiment. The different features of this embodiment are that communication control program 21 is stored in the built-in type ROM of the microcomputer 3 on the handy device 1, and data storing area 22 is provided in flash memory 4. In addition, the handy device 1 has the RS-232C driver 23 which transmits and receives serial data coupled to microcomputer 3. Control program 18, which controls the operation of storing the application data 24 to be transmitted to the handy handy 1, is stored in memory 14 on host machine 2 which is coupled through interface cable 20.

Figure 10:
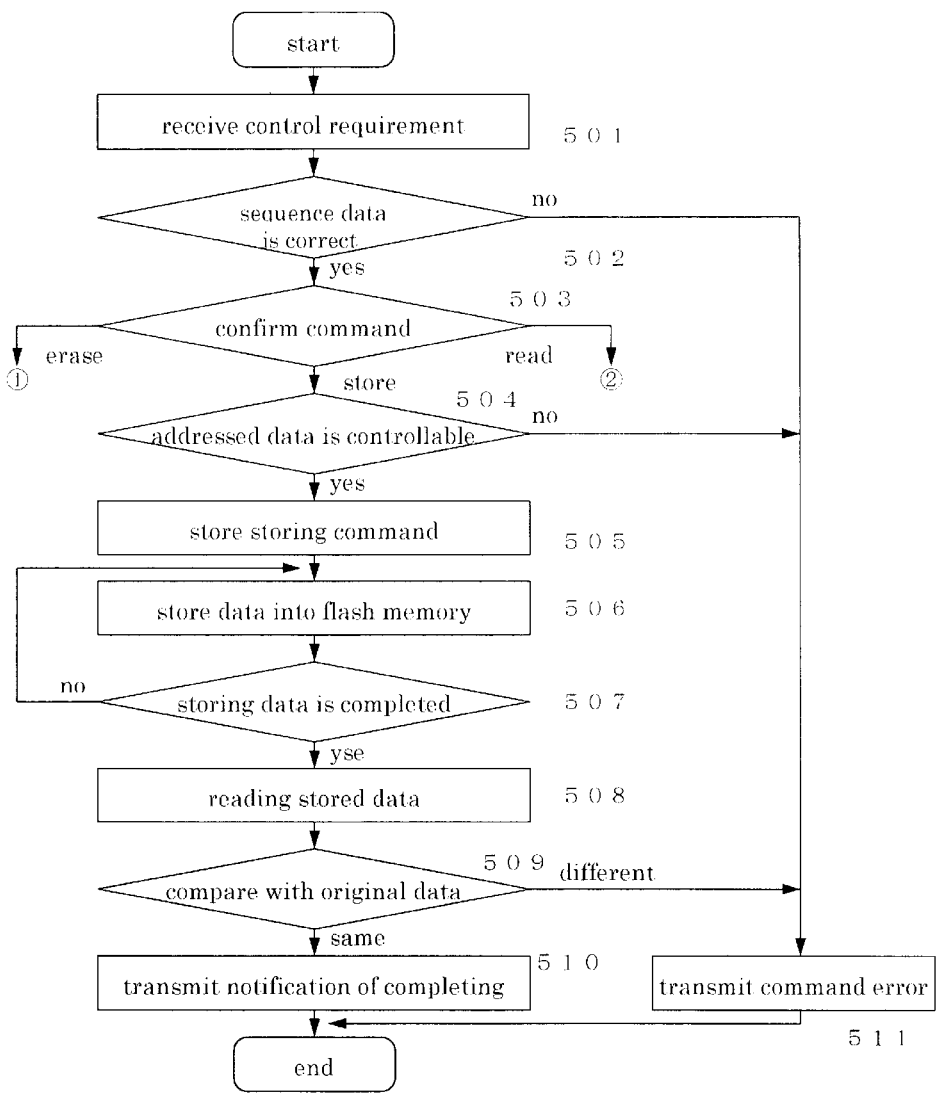
FIG. 10 is a flowchart showing the operation of the handy device concerned with the fourth embodiment.

Next, the control operation, that microcomputer 3 processes the data to store into the flash memory 4, will be described by using the flowchart shown in FIG. 10. The sequence data of the control requirement to the flash memory 4 is composed of the control classification command, the address and data. In case the microcomputer 3 on the handy device 1 receives the control requirement to flash memory 4 from host machine 2 (step 501) the microcomputer 3 confirms whether the received sequence data is correct or not (step 502). In case the data line is normalcy, the classification of the control classification command is distinguished, and which requirement of the read, writing and erasure is distinguished (step 503). In case the command other than said command is received, command error is transmitted to the host machine 2 (step 511). In case said classification is recognized as the storing requirement, the microcomputer 3 acquired address to access the received sequence data, and confirms whether data stored at the address is controllable or not (step 504). In case the address is set at the access prohibition address area of flash memory 4, the microcomputer 3 recognizes it as the address error, and transmits the notification of communication error to the host machine 2 (step 511). In case data stored at said address is controllable, the microcomputer 3 stores the storing command into the address of flash memory 4 (step 505). Then, received data is stored into the specified address of flash memory 4 (step 506). After completing the storing data (step 507), the data is read from the address (step 508) and is compared with original data. In case data is different, the microcomputer 3 recognizes it as a communication error, and transmits the notification of communication error to the host machine 2 (step 511). In case data is the same, notification of completing the storing data is transmitted to the host machine 2 (step 510).

In case classification of s503 is recognized as the erasing requirement, the microcomputer 3 acquires the address to access from the received sequence data, and confirms whether data stored at the address is controllable or not (step 512). In case the address is set at the access prohibition address area, the microcomputer 3 recognizes it as the address error, and transmits the notification of address error to the host machine 2 (step 517). In case data stored at the address is controllable, the microcomputer 3 stores the erasing command in the address of flash memory 4 (step 513). When erasing is completed, the microcomputer 3 reads the data of the erased area (step 514) and confirms read data (step 515). In case the read data is other than 0×FF, the microcomputer 3 recognizes it as the erasing error, and the notification of the error is transmitted to the host machine 2 (step 517). In case the read data is 0×FF, the microcomputer 3 transmits the notification of completing the erasing process to the host machine 2 (step 516).

In case classification of s503 is recognized as the reading requirement, the microcomputer 3 acquires the address to access from the received sequence data, confirms whether data stored at the address is controllable or not (step 518). In case the address is set at the access prohibition address area, the microcomputer 3 recognizes it as the address error, and transmits the notification of the error to the host machine 2 (step 521). In case data stored at the address is controllable, the data of specified length is read from the address of the memory (step 519). After reading, the read data is transmitted to the host machine 2 (step 520), and the reading process is completed.

The microcomputer 3 controls the flash memory 4. Control of storing into, erasing or reading from the flash memory 4 is carried out by the host machine 2 which specifies the control classification and the data address. Even if the IC card connector is used for coupling to the host machine instead of RS-232C, control of flash memory 4 is enabled.

Figure 11:
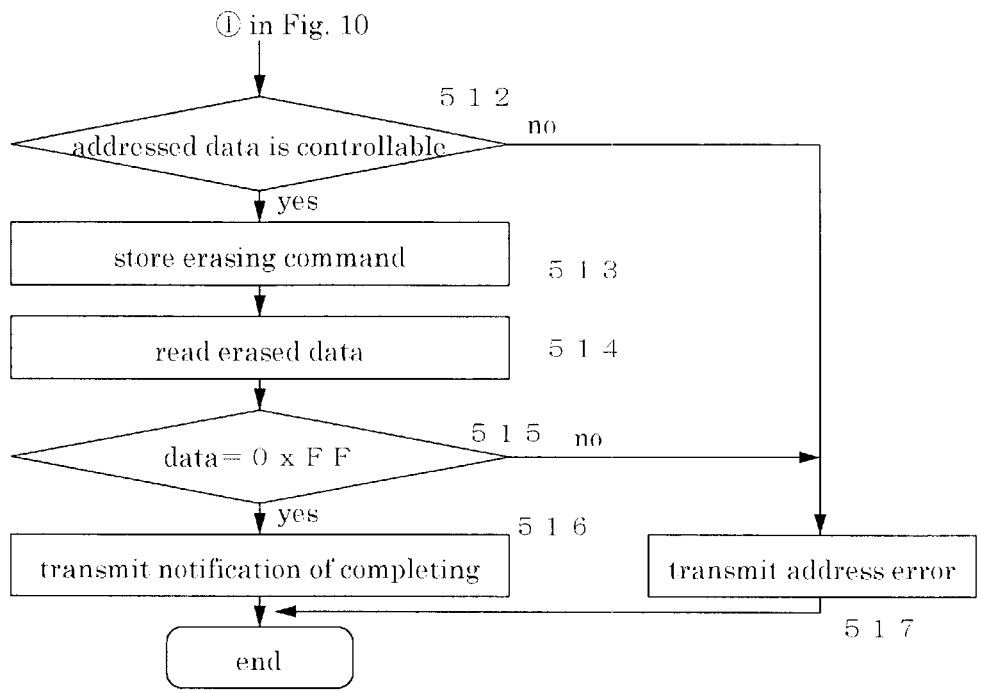
FIG. 11 is a flowchart showing the operation of the handy device concerned with the fourth embodiment.
Figure 12:
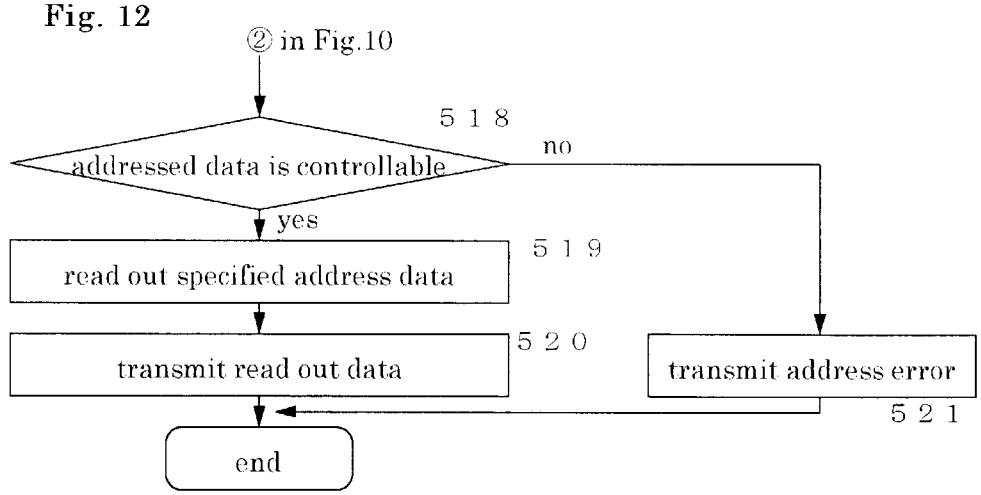
FIG. 12 is a flowchart showing the operation of the handy device concerned with the fourth embodiment.
Figure 13:
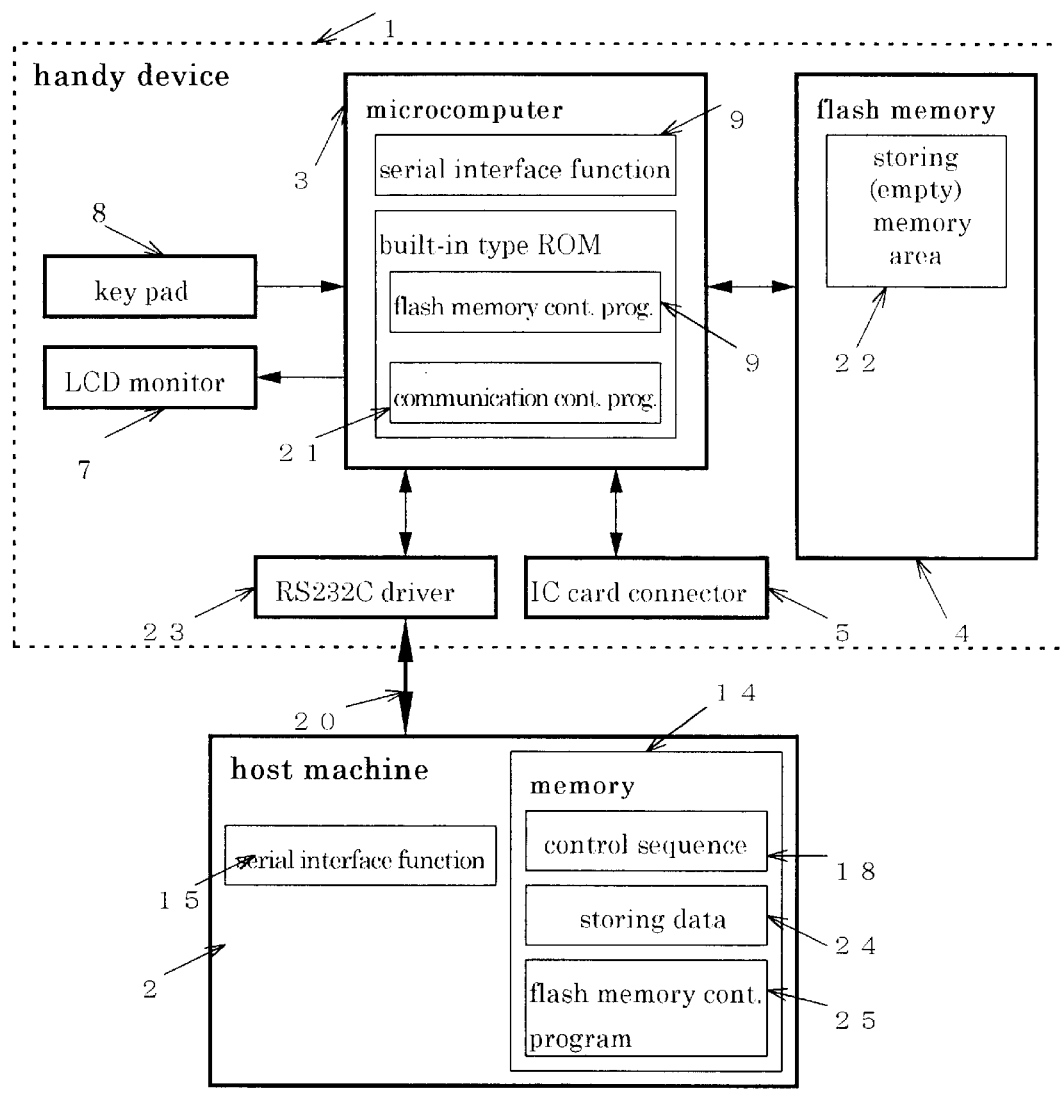
FIG. 13 is a block diagram showing the structure of the fifth embodiment of the present invention.
Figure 14:
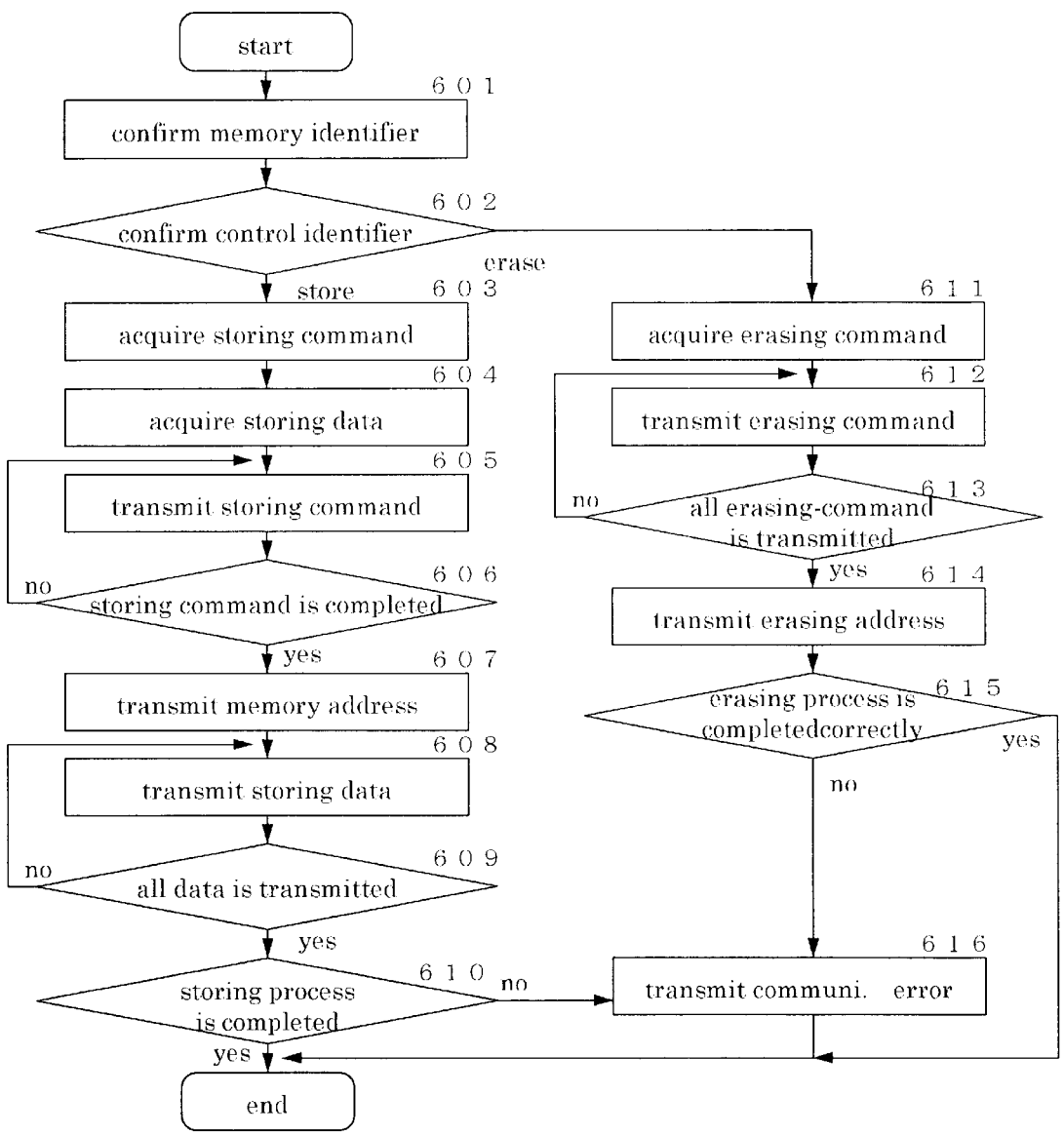
FIG. 14 is a flowchart showing the operation of the host machine concerned with the fifth embodiment.

FIG. 13 is the block diagram showing the structure of the fifth embodiment. The different points from said fourth embodiment shown in FIG. 11 is that flash memory control program 25 for controlling the flash memory is further stored into the memory 14 on the host machine 2. FIG. 14 is the flowchart showing the operation of the data storing to the flash memory by the microcomputer 3. This control operation is carried out, in case the flash memory 4, which cannot be controlled by flash memory control program 9 stored in the built-in type ROM on microcomputer 3, is mounted on the handy device 1. In this case, the microcomputer 3 does not specify the control command, but the host machine 2 specifies the storing address and the command directly, and controls flash memory 4. First, the classification of flash memory 4 is confirmed (step 601). Then, the control classification to flash memory 4 is distinguished (step 602). In case control classification is recognized as storing control, flash memory control program 25 in the memory 14 on the host machine 2 is started, and the storing command is acquired (step 603). After acquiring the storing command, the storing data is acquired (step 604). After acquiring the data, the host machine 2 transmits the acquired storing command to the handy device 1 (step 605). The host machine 2 confirms whether the storing command is a plurality of bytes or not (step 606), and in case of a plurality of bytes, this transmission is repeated until all commands are transmitted. After transmitting the storing command, the address of the flash memory into which the data is stored is transmitted (step 607). After that, storing data 24 is transmitted to handy device 1 (step 608). The number of storing data 24 is detected (step 609), and this transmitting is repeated until all data is transmitted. After transmitting the data, microcomputer 3 confirms whether the data is correctly stored into the flash memory 4 on the handy handy 1 or not (step 610). In case it is not correctly stored, the notification of the storing error is transmitted to the host machine 1 (step 616).

In case the control classification is recognized as a erasing control (step 602), flash memory control program 25 in the memory 14 on the host machine 2 is started, and the host machine 2 acquires the erasing command (step 611). After acquiring the erasing command, acquired command is transmitted to the handy device 1 (step 612). Then, the number of erasing command is detected (step 613), in case of a plurality of commands, this transmission is repeated until all commands are transmitted. After transmitting the erasing command, the address of the flash memory, in which the data is to be erased, is transmitted (step 614). After transmitting the address, the microcomputer 3 confirms the data is correctly erased or not (step 615). In case it is not correctly erased, the notification of the error is transmitted to the host machine 1 (step 616). Even if the IC card connector is used for coupling to the host machine 2, control of flash memory 4 is also enabled. As showing this processing, the data in the flash memory can be changed or erased even if the flash memory control program is not stored in the built-in type ROM on the handy device.

Figure 15:
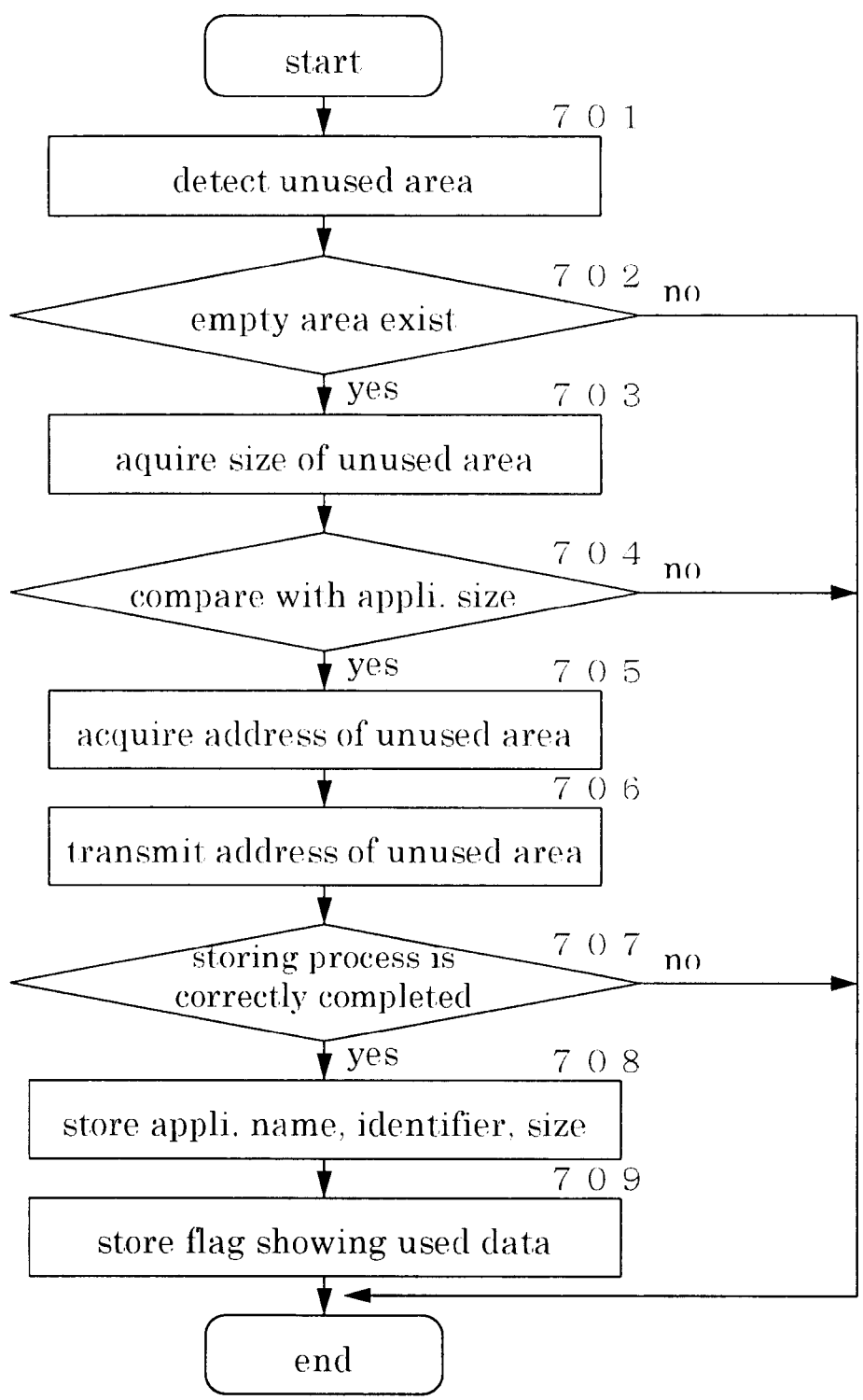
FIG. 15 is a flowchart showing the operation of the handy device concerned with the sixth embodiment of the present invention.

Next, the sixth embodiment of the present invention will be described. The feature of this embodiment is providing the sequence which manages the application. The structure of this embodiment is equal to the structure of FIG. 1. The operation of the sixth embodiment will be described by using FIG. 15, FIG. 16 and FIG. 17. FIG. 17 is the table showing management of the information stored in management table 12 of the flash memory 4. The sequence which manages the application will be described by using the flowchart FIG. 15. In case the handy device 1 receives and installs application information 19 transmitted from host machine 2, the microcomputer 3 starts control program 11 of the flash memory 4 and confirms the application information in management table 12 of flash memory 4. Then, the unused area is detected by using the flag, which shows used area or unused area (step 701). After detection of the unused area (step 702), the possible application storing size of the unused area is acquired (step 703), and the size of the application and the size of the unused area are compared (step 704). In case the application can be stored into the unused area, the microcomputer 3 acquires the first address of the unused area into which the application is stored (step 705). The microcomputer 3 transmits the acquired address to the host machine 2 (step 706). In case application program 17 is correctly stored in application program storing area 13 of flash memory 4 to the end (step 707), the application name, the application identifier, version information and the application size are stored at the last of the application management table. (step 708). Then, the application identifier and the flag showing used area are stored in the application management table (step 709), and the install of the application is completed.

In case of erasing, the application which is erased is selected by using the application management table, and the application identifier is acquired. Then, the size and first address of the area, in which the application is stored, are detected. And application which was stored in the area is erased. All application information concerning the application is erased from the application management table, and the number of install applications is renewed. Application erasing process is completed. The information of installed application can be easily recognized by reading the application management table.

Figure 18:
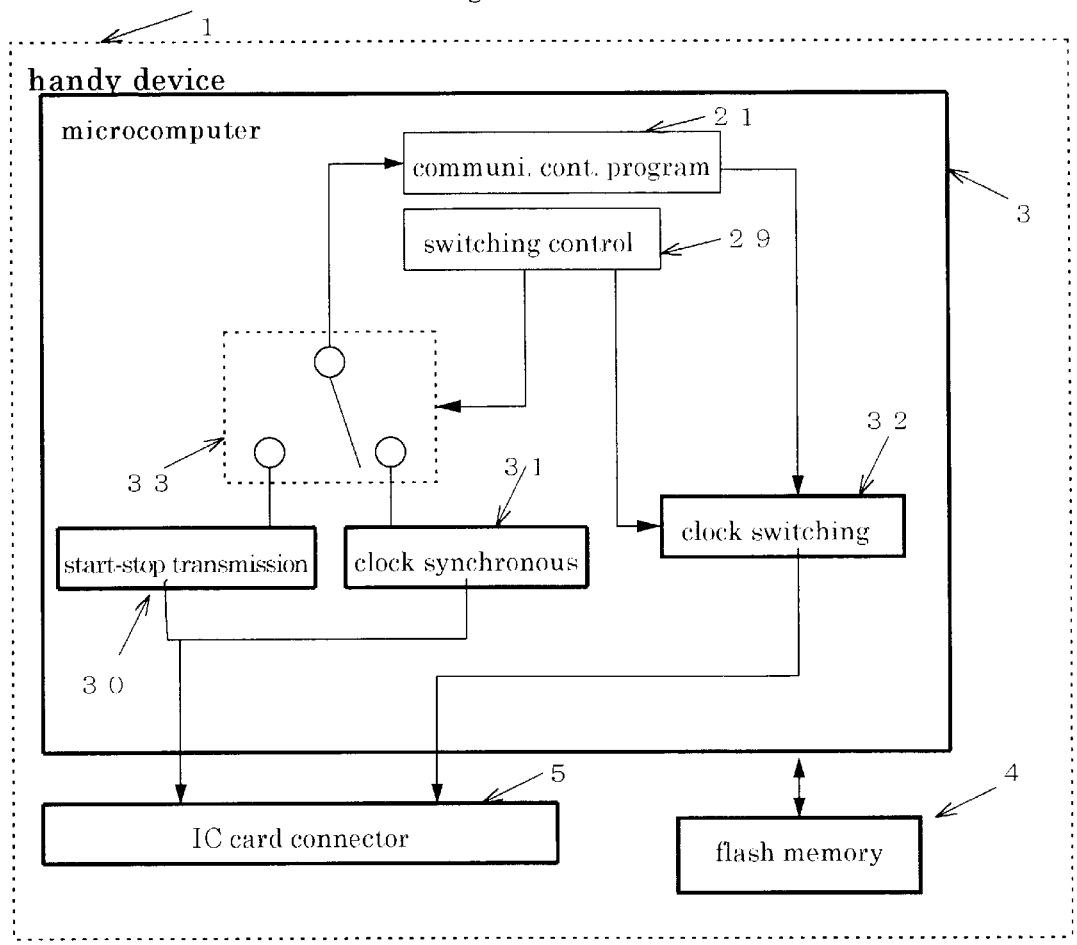
FIG. 18 is a block diagram showing the structure of the handy system concerned with the seventh embodiment of the present invention.

Next, the seventh embodiment of the present invention will be described by using FIG. 18. This embodiment uses the IC card connector for reading data and installing the application program. The handy device 1 comprises microcomputer 3, flash memory 4 and IC card connector 5. The microcomputer 3 comprises communication control program 21 which controls transmitting and receiving of data, changing program 29 by which the communication interface and the control clock are changed, communication interface of the start-stop transmission 30 and communication interface 31 of the clock synchronous, clock switching control unit 32 which controls the oscillation, switching circuit 33 into which the couple of communication interface 30,31. In case IC card connector 5 is used for reading and writing the data of the IC card, change program 29 stored in the microcomputer 3 selects start-stop transmission interface 30 as a communication interface by switching circuit 33. The changing program 29 controls clock switching control unit 32 to change the clock for the reading and writing of the IC card, and communication control program 21 executes communication with the IC card. In case IC card connector 5 is used for installing the system application program, the change program 29 changes the communication interface to clock synchronism interface 31 by switching circuit 33. Clock switching control 32 is changed to the clock for clock synchronism, and communication control program 21 reads the application program through the IC card connector 5 and stores it into the flash memory 4 on the handy device 1. As mentioned above, the IC card connector can be used for reading data from, storing data into IC card, and for installing application program into IC card.

Figure 19:
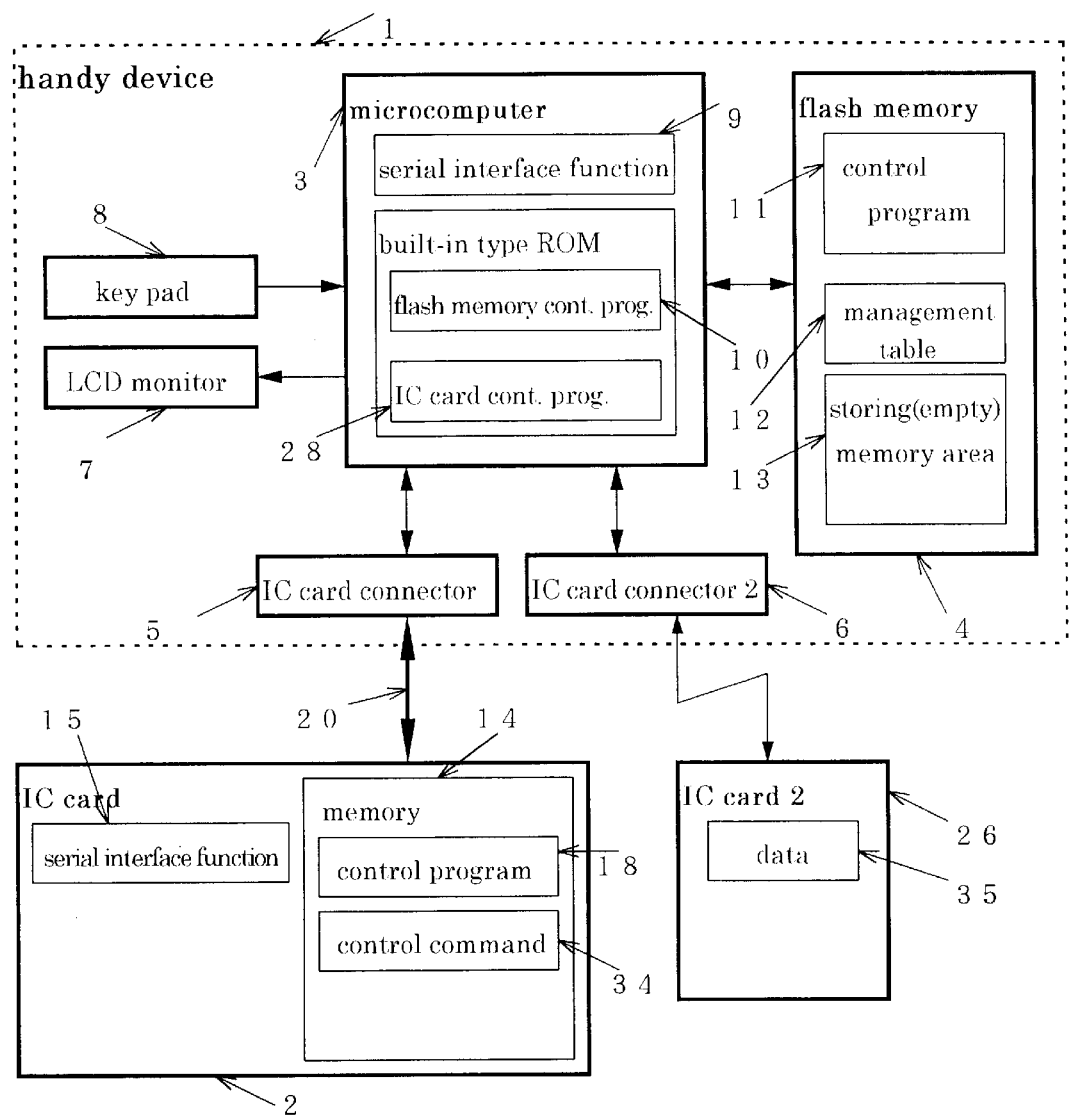
FIG. 19 is a block diagram showing the structure of the handy system concerned with the eighth embodiment of the present invention.

Next, the eighth embodiment of the present invention will be described by using FIG. 19. These embodiments mentioned above are described as examples of installing the application program into flash memory on handy device. In this case, while the program can be installed into the flash memory on the handy handy through IC card connector 5, IC card can communicate with the personal computer through both IC card connector 5 and 6. For example, the handy device 1 having LCD monitor 8 can be used as IC card reader/writer connected with the personal computer (PC) 30 showing FIG. 19. In this embodiment, the control command from the PC 30 is input into the IC card connector 5 through interface cable 20. The microcomputer 3 on the handy device 1 receives the input control command. The microcomputer 3 transmits the received control command to the IC card 26 by using IC card control program 28 through IC card connector 6. The IC card 26, which receives the control command, processes reading or writing the data corresponded to the received control command. Then, the IC card 26 transmits the processing result to the handy device 1 through the IC card connector 6, and the handy device 1 transmits the received processing result to the PC 30 through IC card connector 5 and interface cable 20. It is possible to show and to confirm that data is correctly transmitted by displaying it on the LCD monitor 8. By using handy device 1 as an IC card reader/writer, data in the IC card can be read, and written by the PC 30.

It was described that IC card 26 is connected with PC 30 through IC card connectors 5,6. In the handy device having the RS-232C driver, IC card 26 can be connected with PC 30 through the RS-232C interface and the IC card connector 6.

According to the present invention, the application program is installed into the handy device by using the IC card connector which is attached to the handy device. In addition, the exclusive connector for installing an application is not necessary, and does not increase the cost at manufacturing the handy device. The time of storing application can be shortened because the application is stored using the clock synchronous type interface changed form the start-stop transmission type interface.

According to the present invention, by using the memory restoring control function stored in the handy device, the host machine does not have to recognize the classification of the flash memory mounted on the handy handy. As a result, the host machine only has the application data and does not have to manage the memory restoring control function at the time of installing the application. Therefore, the load of the host machine can be reduced.

The host machine recognizes the empty address area, into which the data can be stored, and relocates the application program based on the address. As a result, the program is never overwritten, and the empty address area can be used efficiently. At the time of the application install, processing of certifying code number can prevent unfair installing application, and prevents unfair erasing of the application. Since application information is collectively managed in the management table, the application information installed in the handy device is recognized by reading the information of the management table.

While we have shown and described several embodiments in accordance with our invention, it should be understood that disclosed embodiments are susceptible of changes and modifications without departing from the scope of the invention. Therefor, we do not intend to be bound by the details shown and described herein but intend to cover all such changes and modifications a fall within the ambit of the appended claims.

What is claimed is:

1. A terminal device, comprising;
   an IC card connector into which an IC card is inserted and which connects with an external device;
   a memory to store an IC card control program to be used when reading/writing from/to said IC card, an application program input via said IC card connector, and a control program to be used when said application program is stored into said memory; and
   a processor which, according to said control program, sends empty address space of said memory to said external device via said IC card connector, receives said application program relocated according to the empty address via said IC card connector, and then stores said relocated application program into said memory.

2. The terminal device of claim 1, further comprising:
   said control program controlling detecting of an empty address in the memory and communicating the detected empty address to outside said terminal device through said IC card connector; and
   said control program being responsive to receiving an application program from outside of said terminal device through said IC card connector that has been relocated according to said detected empty address.

3. The terminal device of claim 1, including another connector and an IC card connected with said another connector, said IC card storing certification data, and said processor confirming with said certification data whether said application program is stored into said memory.

4. The terminal device of claim 1, further comprising means for displaying a condition of said stored application program in order to recognize said stored application program.

5. The terminal device of claim 1, further comprising means for managing said stored application program in order to detect said empty address.

6. The terminal device of claim 1, further comprising:
   means for detecting error of said application program provided through said IC card connector;

means for transmitting said detected error from the terminal device to a host computer.

7. A terminal device, comprising:

an IC card connector into which an IC card is inserted;

another connector to connect with an external device;

a memory to store an IC card control program to be used when reading/writing from/to said IC card, an application program input via said another connector, and a control program to be used when said application program is stored into said memory; and a processor which, according to said control program, sends empty address space of said memory to said external device via said another connector, receives said application program relocated according to the empty address via said IC card connector, and then stores said relocated application program into said memory.

8. The terminal device of claim 7, further comprising:

said control program controlling detecting of an empty address in the memory and communicating the detected empty address to outside said terminal device through one of said IC card connector and said connector; and said control program being responsive to receiving an application program from outside of said terminal device through said one connector that has been relocated according to said detected empty address.

9. The terminal device of claim 8, including an IC card connected with IC card connector, said IC card storing certification data, and said processor confirming with said certification data whether said application program is stored into said memory.

10. The terminal device of claim 8, further comprising means for displaying a condition of said stored application program in order to recognize said stored application program.

11. The terminal device of claim 8, further comprising means for managing said stored application program in order to detect said empty address.

12. The terminal device of claim 8, further comprising:

means for detecting error of said application program provided through said one connector;

means for transmitting said detected error from the terminal device to a host computer.

13. A terminal device, comprising:

a first IC card connector into which an IC card is inserted;

a second IC card connector to connect with an external device;

a memory to store an IC card control program to be used when reading/writing from/to said IC card, an application program input via said second connector, and a control program to be used when said application program is stored into said memory; and a processor which, according to said control program, sends empty address space of said memory to said external device via said second IC card connector, receives said application program relocated according to the empty address via said second IC card connector, and then stores said relocated application program into said memory.

14. The terminal device of claim 13, further comprising:

said control program controlling detecting of an empty address in the memory and communicating the detected empty address to outside said terminal device through one of said IC card connectors; and said control program being responsive to receiving an application program from outside of said terminal device through said one IC card connector that has been relocated according to said detected empty address.

15. The terminal device of claim 14, including an IC card connected with one of said IC card connectors, said IC card storing certification data, and said processor confirming with said certification data whether said application program is stored into said memory.

16. The terminal device of claim 14, further comprising means for displaying a condition of said stored application program in order to recognize said stored application program.

17. The terminal device of claim 14, further comprising means for managing said stored application program in order to detect said empty address.

18. The terminal device of claim 14, further comprising:

means for detecting error of said application program provided through one of said IC card connectors;

means for transmitting said detected error from the terminal device to a host computer.

* * * * *